T. H. CASKEY, Jr.
COOKING VESSEL ATTACHMENT.
APPLICATION FILED JAN. 13, 1917.
1,253,146.
Patented Jan. 8, 1918.
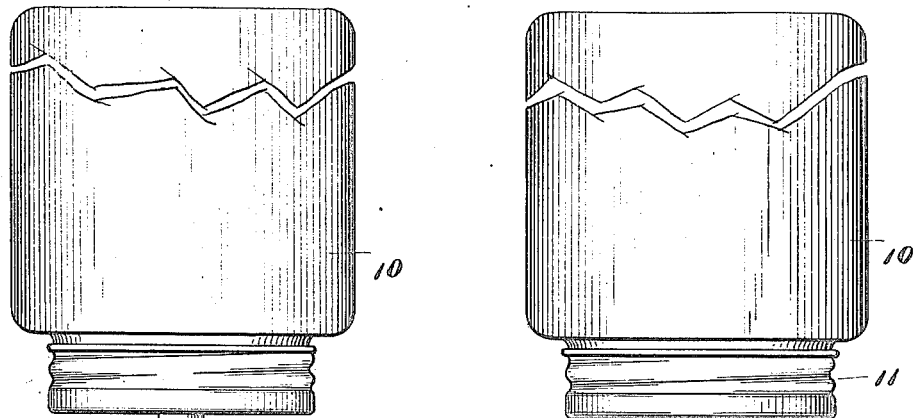
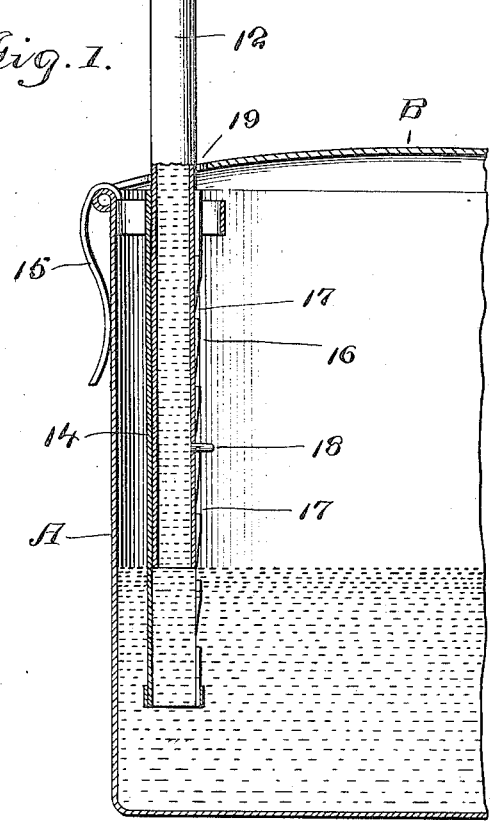
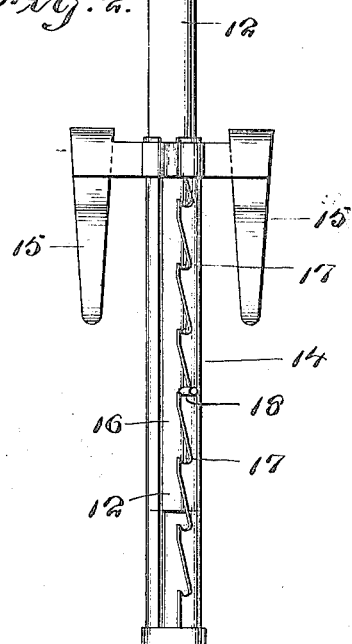
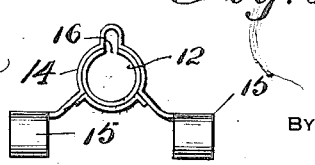
WITNESSES
INVENTOR
T. H. Caskey, Jr.
BY Victor J. Evans
ATTORNEY

UNITED STATES PATENT OFFICE.

THOMAS H. CASKEY, JR., OF CANEY, KENTUCKY.

COOKING-VESSEL ATTACHMENT.

1,253,146.   Specification of Letters Patent.   Patented Jan. 8, 1918.

Application filed January 13, 1917. Serial No. 142,199.

*To all whom it may concern:*

Be it known that I, THOMAS H. CASKEY, Jr., a citizen of the United States, residing at Caney, in the county of Morgan and State of Kentucky, have invented new and useful Improvements in Cooking-Vessel Attachments, of which the following is a specification.

This invention comprehends the provision of means in the nature of an attachment for cooking vessels, for maintaining the water in the vessel at a predetermined level, by automatically replenishing the vessel with water, to compensate for whatever evaporation takes place, thus assuring the cooking of edibles without burning the same.

In carrying out the invention I provide means for the above mentioned purpose, with which water can be supplied to the cooking vessel in quantities consistent with the amount that vanishes by evaporation, whereby the water in the vessel may be maintained at a predetermined level.

Another important object of the invention resides in the provision of a construction to permit the attachment to be readily associated with or removed from the vessel when desired, the device being susceptible of adjustment with respect to the vessel whereby the water may be maintained at different levels therein.

The nature and advantages of the invention will be better understood when the following detail description is read in connection with the accompanying drawing, the invention residing in the construction, combination and arrangement of parts as claimed.

In the drawing forming part of this specification like numerals of reference indicate similar parts in the several views wherein:—

Figure 1 is a sectional view showing the attachment in position upon the vessel for use.

Fig. 2 is a view of the attachment removed from the vessel.

Fig. 3 is a detail view of the supporting means.

Referring more particularly to the drawing in detail A indicates a cooking vessel which may be of any suitable character and B the cover therefor.

The device forming the subject matter of my invention embodies a water container indicated at 10, and which as shown in this specific instance is in the nature of a jar, which is closed by means of a cap or other suitable closure indicated at 11. Depending from the closure 11 and communicating with the container 10, is a tube 12 through which the water is conveyed from the container 10 into the vessel A in a manner and for a purpose to be hereinafter more fully described, it being manifest from an inspection of the drawing, that the container 10 is intended to be supported in an inverted position adjacent the vessel.

Any suitable means may be employed for so supporting the container, but in accordance with the preferred embodiment of the invention use is made of a tubular casing 14 which carries at one end a resilient clamp 15 adapted to embrace the upper edge of the vessel A in the manner whereby the tubular casing 14 is held vertically within the vessel A, but close to the wall thereof. The casing 14 is longitudinally slotted as at 16, while one wall of the slot is formed to provide a longitudinal series of notches 17. The casing 14 slidably receives the tube 12 depending from the closure 11 of the container, a pin 18 projecting from the tube and through the slot 16 when the parts are associated. It is obvious that when the pin 18 is positioned in one of the notches 17 the container and its associated parts are supported in proper position upon the vessel for use.

As hereinabove stated the attachment is designed to replenish the vessel A with water from the container 10, from time to time, to compensate for whatever evaporation takes place within the vessel, with a view of maintaining the water therein at a predetermined level, and eliminating to a large degree the possibility of burning the edibles while the latter are being cooked. The water in the vessel forms a seal to prevent the escape of water from the container 10, as long as the lower end of the tube 12 is submerged, it being understood that the water in the tube and container is supported by atmospheric pressure on the water in the vessel, but when the water level in the vessel is lowered as the result of evaporation, air is admitted into the container through the tube and the water from the container is discharged into the vessel A until the predetermined level is again reached. In addition to replenishing the vessel with water for the above mentioned purpose, it is manifest that the water in the vessel A may be maintained at any predetermined level, depending upon the particular disposition of the lower extremity of the tube 12, which can be varied by reason of the adjustability of the tube with respect to the casing 14. The attachment can be readily and easily associated with the vessel or detached therefrom as the occasion may require. The cover B is provided with a notch 19 to receive the tubular casing 14, so that the cover may be properly positioned upon the vessel.

While it is believed that from the foregoing description the nature and advantages of the invention will be readily apparent, I desire to have it understood that what is herein shown and described is merely illustrative of the preferred embodiment of the invention, and is not to be considered in any way restrictive, as such changes may be resorted to when desired as fall within the scope of what is claimed.

What is claimed is:—

1. The combination with a cooking vessel, of a tubular casing wholly disposed within the vessel, a resilient clamp carried by the casing and adapted to engage over the upper edge of the vessel to support the casing in close proximity to the wall thereof, a water container, a tube depending from the water container and slidably fitted in said casing, and means for holding said tube fixed relative to the casing in different adjusted positions.

2. The combination with a cooking vessel, of a tubular casing wholly disposed within the vessel, a resilient clamp carried by the casing and engaged over the upper edge of the vessel to support the casing in close proximity to the wall of the vessel, a water container, a tube depending from the container and slidably fitted within said casing, said casing having a longitudinally extending slot and a series of notches at one side of the slot, a pin projecting from said tube and movable in the slot, said pin being adapted to engage in one of said notches to hold the tube fixed relatively to the casing in any adjusted position.

In testimony whereof I affix my signature.

THOMAS H. CASKEY, Jr.